Oct. 11, 1949.　　　　G. TURRALL ET AL　　　　2,484,196
MACHINE FOR SEPARATING AND FEEDING
COUNTED BATCHES OF ARTICLES
Filed Feb. 27, 1946　　　　　　　　　　　　　3 Sheets-Sheet 3
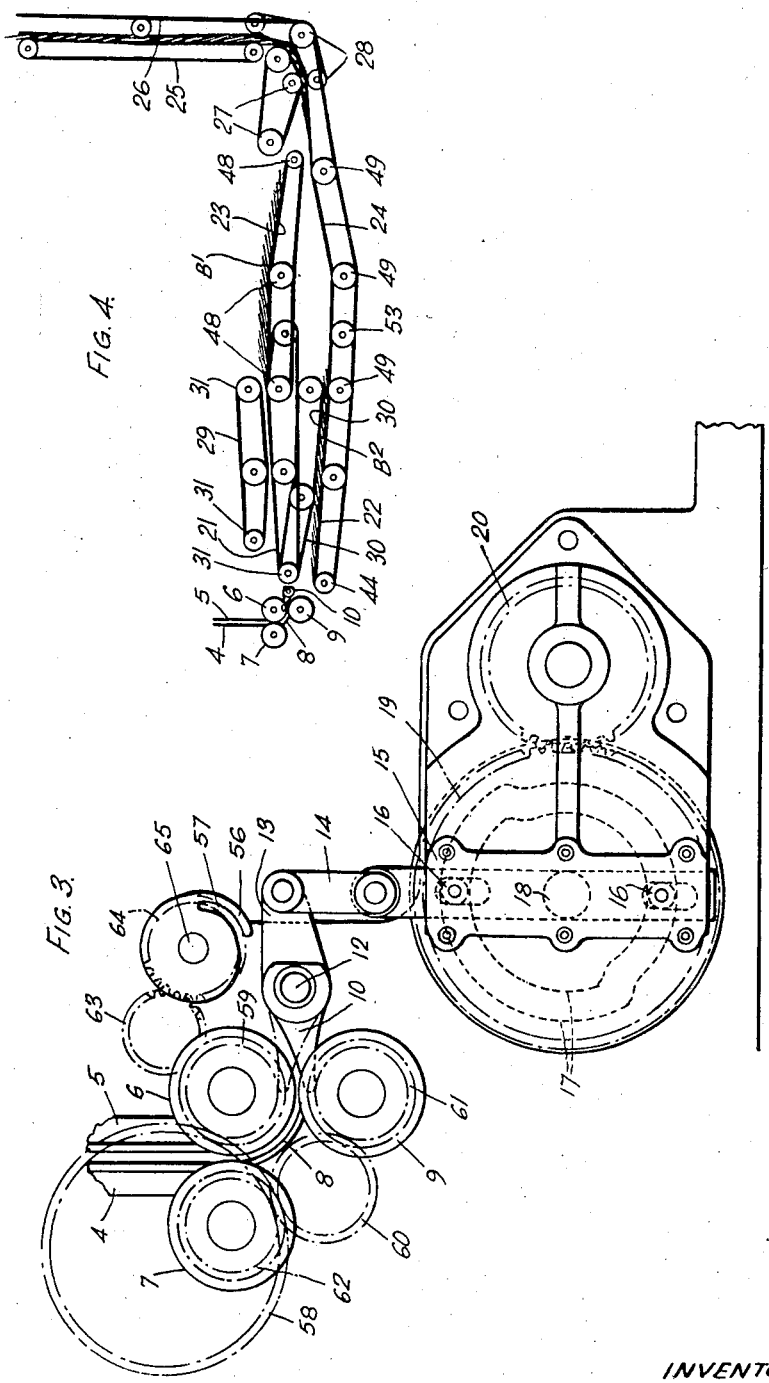
INVENTORS.
GEORGE TURRALL
CHARLES H. SKINNER
BY Albert J. Forton
ATTORNEY Patented Oct. 11, 1949

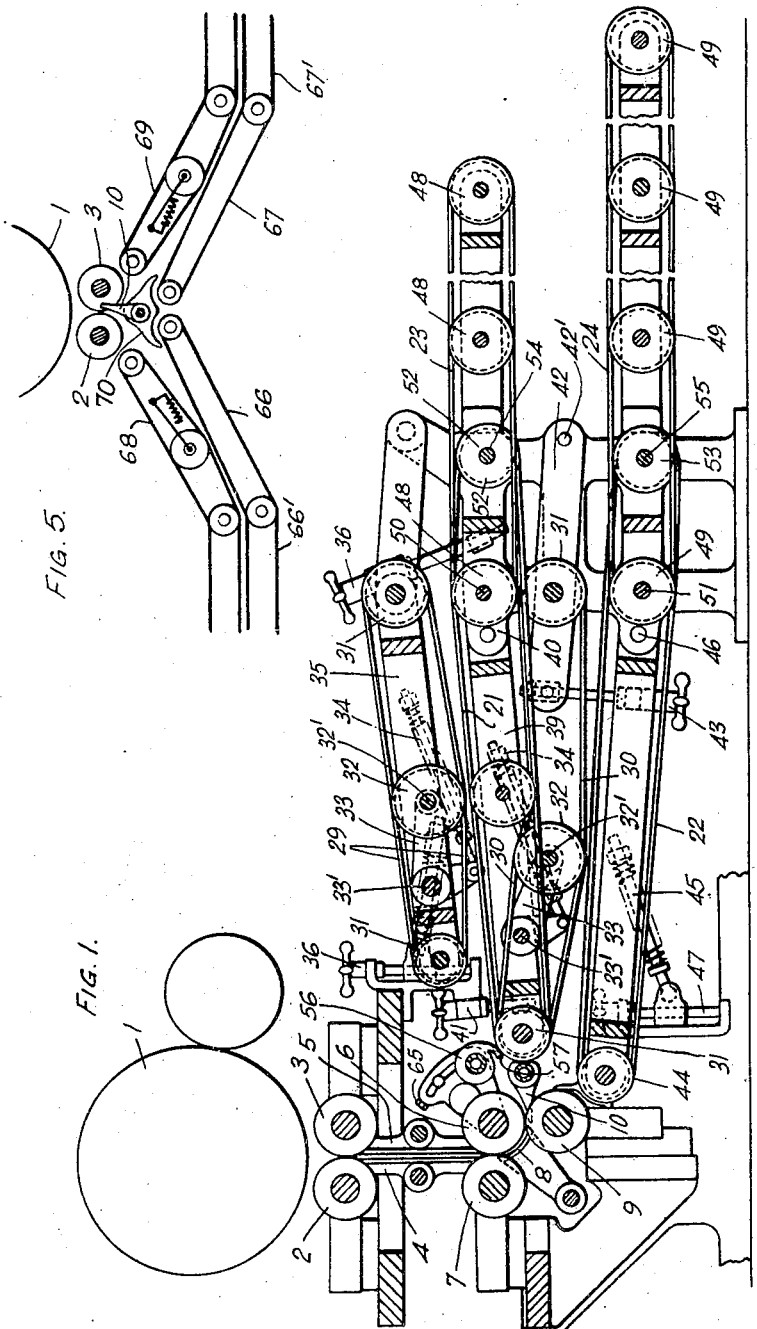

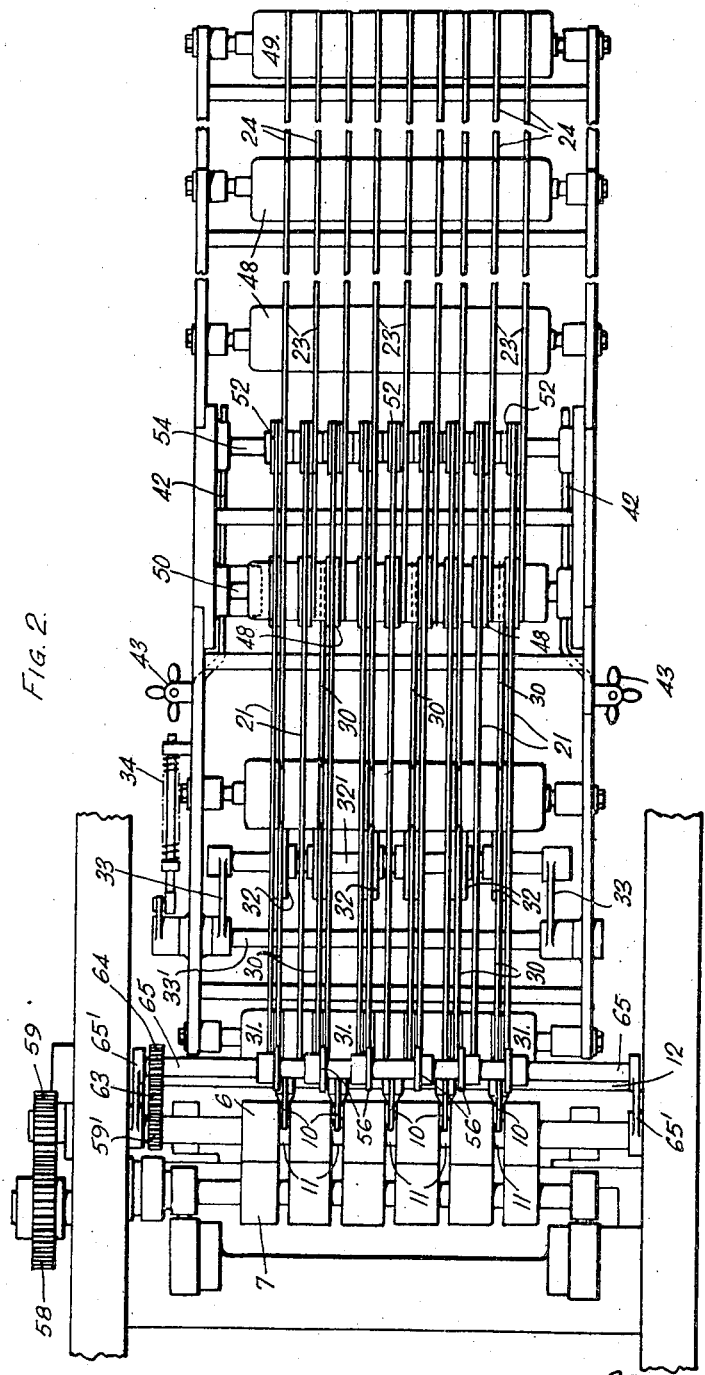

2,484,196

UNITED STATES PATENT OFFICE 2,484,196

MACHINE FOR SEPARATING AND FEEDING COUNTED BATCHES OF ARTICLES

George Turrall and Charles Henry Skinner, London, England, assignors to R. Hoe & Co. Inc., New York, N. Y., a corporation of New York Application February 27, 1946, Serial No. 650,671
In Great Britain March 3, 1945

5 Claims. (Cl. 93—93)

This invention relates to improvements in counting arrangements for counting the products of machines such as printing machines from which the products issue in a more or less flat condition. One object of this invention is to provide an improved mechanism by which counting of the products is effected by separating the continuous stream of successive products into a continuous stream of batches each consisting of a predetermined number of products.

A further object of this invention is to provide an improved arrangement whereby a continuous stream of products passing in succession can be separated into batches consisting of a predetermined number of products which travel to different delivery zones where they can be expeditiously handled.

A further object of this invention is to provide counting mechanism which will enable a delivery fly commonly employed in printing machine deliveries to be dispensed with.

According to one feature of the invention there is provided a plurality of travelling supports, means to divert a predetermined number of successive products in the continuous stream first to one support and then to another support, means to accelerate first the products diverted to one support and then to accelerate the products diverted to another support, and conveying means operating continuously at a speed which is greater than that of the travelling supports (and is usually equal to the speed to which acceleration is effected) to take the accelerated products first from one support and then from another support, this conveying means transporting the now separated batches to the desired delivery zone. The speed at which the travelling supports would normally move would be so related to the rate of delivery of the products to the support, that those products are deposited on the support in overlapping relationship. In general it would be preferable to accelerate one batch of products while the products to form the following batch are being directed to the other travelling support.

According to a further feature of the invention apparatus for use in separating a continuous stream of products into separated counted batches comprises a pair of continuously movable supports, means to divert first a predetermined number of successive products to one support and then a predetermined number of successive products to the other support so that the products are taken away to different delivery zones as separated batches having products in overlapping relationship.

In general the travelling supports would be formed by endless belts, tapes or the like.

The switch or deflecting device of this invention would normally be arranged to control the products as they issue from the machine that is to say the arrangement is such that a delivery fan or fly is not employed.

The invention is illustrated in the accompanying drawings in which Figures 1–4 illustrate one arrangement, Figure 1 being a longitudinal sectional elevation, Figure 2 a plan view with certain parts omitted, Figure 3 a detail elevation to a larger scale and Figure 4 a diagrammatic view; Figure 5 is a diagrammatic view of a modified arrangement.

The invention is, in all of the figures, shown applied to a delivery which receives folded products passing from a conventional folding mechanism of a printing machine; this folding mechanism comprises a folding cylinder 1 having folding-off blades (not shown) which are operated in the usual manner to be projected beyond the periphery of the cylinder 1 to carry the central part of a product on the cylinder to between the nip of folding-off rollers 2, 3 from between which the products will issue in succession with their folded edges leading; the operation of this class of mechanism is so well known that it is believed unnecessary to describe it further.

Thus, so far as concerns this invention there pass from the rollers 2, 3, a succession of products to be handled by the delivery mechanism of this invention.

Referring firstly to Figures 1–4, the purpose of the mechanism therein shown is to enable the products to be separated into counted batches which pass in regular succession with the batches spaced apart in the stream. The products issuing from the folding-off rollers 2, 3 pass down between guides 4, 5 to rollers 6, 7 which advance the copies to curved plates 8 operating to change the direction of the copies from the vertical to the horizontal, the roller 6 co-operating with a further roller 9 to project the copies in a sensibly horizontal direction.

Immediately on the discharge side of these rollers 6 and 9 are switches or deflectors 10 which are movable in grooves 11 formed in those rollers as is seen in Figure 2. These switches are mounted on a shaft 12 which as is shown in Figure 3 has an arm 13 coupled by a link 14 to an actuating component 15 having cam followers 16 engaged by a "box" cam 17 on a shaft 18; this shaft 18 is driven through gears 19, 20 from some part of the machine so that the speed of the cam is related to the rate at which products pass from the rollers 6, 9.

These switches are disposed in the region of the ends of two superposed travelling supports each in the form of sets of endless conveyor belts or tapes 21, 22; the function of the switch device is to deflect products first to the upper run of the conveyor belts 21 and then (after a predetermined number of products has passed thereto) to deflect succeeding products to the upper run of the other conveyor belts 22 and so on.

Thus the switches 10 in one extreme position divert products issuing from between the rollers 6, 9 to the upper run of the lower conveyor belts 22 and in the other extreme position they divert the products to the upper run of the upper conveyor belts 21. The switch is held by the cam 17 in one extreme position while the copies to form a batch pass say to the lower conveyor belts 22 which are moving continuously so that the copies are laid down lying partly over one another with any desired pitch (dependent on the speed of the belts) and are conveyed towards the take off end of the equipment. As the last copy of this batch is being delivered to the lower conveyor belts 22 the switch 10 is operated by the cam 17 to divert the next copy issuing from between the rollers 6, 9 on to the upper run of the upper conveyor belts 21 which are also moving continuously and upon which as a result the products are laid down, the switch remaining in this position until the final copy of the next batch has been diverted to the upper conveyor whereupon the switch 10 is reversed to divert copies to the lower conveyor and so on.

The products have so far merely been divided into batches travelling at different levels; in order to establish a gap between the batches in their sense of travel the following mechanism is provided, this mechanism operating to speed up the counted batch delivered to one set of belts 21 (or 22) during the time that the counted batch is being formed on the other set of belts 22 (or 21) or at least before a batch on the other belts 22 (or 21) reach the speed-up mechanism.

This mechanism comprises in the construction shown further conveyor belts or tapes 23, 24 which are constantly driven at a speed greater than that of the conveyor belts 21, 22 the paths of the conveyor belts 23, 24 respectively overlapping the paths of the conveyor belts 21, 22.

Thus as the batches are carried along by the low speed conveyor belts 21 and 22 first the batch on one set of these conveyor belts passes under the control of the associated higher speed conveyor belts 23 or 24 and then similarly a batch on the other low speed conveyor belts passes to the higher speed conveyor belts. Therefore first one batch is accelerated by one set of the higher speed conveyor belts while the batch on the other conveyor is still travelling at the speed of the slow speed belts of that conveyor. Uusually this operation will be timed so to occur that while one batch is being laid on the low speed belts of one conveyor the preceding batch already laid and completed on the other low speed conveyor belts will be taken by its higher speed belts and accelerated in the manner referred to. Thus it will be seen that batches will not only be separated at different levels but that due to the acceleration, the batches will not form (in the sense of movement) continuations of one another but will in fact be spaced apart.

It is now merely necessary to combine in a single stream moving at the speed of the high speed conveyor belts 23, 24, the counted and now separated batches to provide the desired continuous stream of separated batches; for this purpose the batches are taken first from one set of high speed conveyor belts 23 and then from the other set of high speed conveyor belts 24 by a take-away conveyor moving continuously at the speed of the high speed conveyor belts 23, 24.

The arrangement for effecting this is shown in Figure 4 where there are employed wire conveyors 25, 26 these wire conveyors 25, 26 passing at their receiving end over pulleys indicated generally at 27, 28 so disposed as to form between the conveyors a receiving jaw into which the batches on the belts 23, 24 can successively pass between the wire conveyors by which they are taken away as for example to a publishing room. This figure illustrates diagrammatically the disposition of a number of batches. On the upper high speed conveyor belts 23 is indicated a completed batch B' which is being conveyed at the higher speed while on the low speed conveyor belts 22 a batch $B^2$ is still being completed the gap being formed at this time. Obviously as the conveyor belts 23 present the batch B' thereon to the wire conveyors 25, 26 the gap which has been formed between the two batches B', $B^2$ is maintained so that at the time the batch $B^2$ on the lower low speed conveyor belts 22 has been completed and accelerated by the higher speed belts the preceding batch is being carried away by the higher speed wire conveyors 25, 26 and so maintains the gap.

In the case of the upper conveyor belts 21 it may be desirable to provide adjacent the point at which products pass to them from the switch 10 control belts 29 which are driven at the speed of the belts 21, 22 and will hold down and form with the belts 21 a passage for the control of the products. This same arrangement may as shown be applied also to the lower conveyor belts 22, the control belts being indicated at 30 and in either case these control belts 29, 30 would be capable of yielding bodily so that in the event of a "jam" occurring the belts will yield to allow the jam to clear.

For this purpose the control belts 29, 30 pass around pulleys 31 and over pulleys 32 on shafts 32' at the outer ends of arms 33 which are pivotally supported on shafts 33' and biased by springs 34 so that the pulleys 32 can yield.

The position of the various belts as to their separation is also adjustable to suit the particular products being dealt with; for this purpose, the pulleys 31 of the control belts 29 are carried by a frame 35 which is bodily adjustable by screw arrangements 36 at each end; the forward pulleys 31 of the control belts 30 are, together with co-axial but separate pulleys for the lower speed belts 21 carried by a frame 39 pivoted at 40 and adjustable by screw mechanism 41; the rear pulleys 31 for the control belts 30 are carried by a frame 42 pivoted at 42' and adjustable by screw arrangements 43; the lower speed belts 22 pass at their forward ends around pulleys 44 carried by a frame 45 pivoted at 46 and adjustable by a screw arrangement 47.

The high speed belts 23, 24 pass over pulleys 48 and 49 respectively, the forward pulleys 48 and 49 being mounted on driving shafts 50, 51 respectively; on these shafts are also loosely mounted guide pulleys over which the slow speed belts 21, 22 pass respectively to pulleys 52, 53 on driven shafts 54, 55.

In order to control the movement of the copies as they pass from the rollers 6, 9 to the upper conveyor belts 21 there may be provided control discs 56 having a curved slot 57 formed in their periphery; the discs are driven at a peripheral speed corresponding to the speed of advance of the products so that any impetus which the product may have obtained is absorbed by the end wall of the slot into which the product passes. The product is thus smoothly laid down on the upper run of the conveyor belts 21; moreover it will be seen that the tongues which overhang the slots 57 operate as the discs rotate, as smoothers to smooth down the products as they lie on the conveyor. The discs are mounted on a shaft 65 carried at its ends in adjusting plates 65' to enable the setting of the discs to be regulated.

For the purpose of obtaining the required rotation of the rollers 6, 7 and 9 and of the control discs 56 the gearing arrangement shown in Figure 3 is employed. A driving gear 58 is in mesh with a gear 59 on the roller 6 and with a gear 60 which in turn meshes with a gear 61 on the roller 9 and a gear 62 on the roller 7. In addition a gear 59' on the roller 6 is connected by an intermediate gear 63 with a gear 64 on the shaft 65 carrying the control discs 56. This arrangement thus provides a compact gear train affording the correct direction of rotation of the various components concerned.

While this invention is mainly concerned in providing a delivery in which the products are taken away in a stream of separated laid down batches, certain parts of the mechanism could with advantage alone be provided for use in a manual take-off arrangement. Thus by the employment of the switch mechanism 10, the upper and lower low speed belts 21 and 22 and their associated control belts 29 and 30 there would be constituted a delivery in which products are delivered in counted batches at two levels from which fly hands can take the batches. In this case the belts 23, 24 would in effect constitute merely extensions of the belts 21, 22 for it would be unnecessary to have acceleration of the products.

Moreover, this double-level delivery could be employed for use with a duplex conveyor arrangement by which the batches would be taken from each level in the printing room and conveyed to the publishing room in a double stream of separated batches.

A modification of this feature is shown in Figure 5. Here again the switch mechanism 10 is employed but in this case instead of diverting the products to conveyors 21, 22 at different levels they are diverted to constant speed conveyors 66, 67 extending downwardly in opposite directions away from the folding cylinder 1 the conveyors 66, 67 conveying products to conveyors 66', 67' extending to the required delivery point. The switch 10 is operated at "count" intervals to direct a counted batch of products first to one conveyor 66 and then to the other conveyor 67, the two conveyors having control belts 68, 69 corresponding in function and operation to the control belts 29, 30 described with reference to Figures 1–4. It will be seen that, co-operating with the switches 10 are deflector plates 70 to ensure the head of one product clearing the tail of the preceding product at the time of change over of the switches 10. In this case also is shown an arrangement in which the products pass direct from the folding-off rollers 2, 3 to the switch 10 instead of being deflected by the guides 4, 5 and 8.

The control belts 29, 30 could be arranged to have a periodic bodily movement (in step with the delivery of products) towards and away from the conveyor belts to provide for the reception of the leading edges of the copies and then their control.

It will be obvious that in the arrangement described the switches 10 which need be only of light construction since they are merely called upon to divert the printed copies, will have a relatively slow action since it can operate to effect the diversion over a period corresponding to the time taken for at least the length of a product to pass a given point, that is to say it is not required to operate in the very short interval between the passing of the trailing end of one product and the leading end of the succeeding product.

In the arrangement shown in Figures 1–4 of the accompanying drawing, the products are directed to travelling supports each comprising two sets of belts one running at a normal speed and the other at a higher speed to effect acceleration of the batches.

It will be understood that modifications of this arrangement may be employed; thus the supports could comprise a single conveyor e. g. a belt which is moved while the products are being delivered to it at the normal speed and is then accelerated to speed up the products delivered to it. Again the supports may be constituted by components carried by an endless conveyor or driving band arrangement which is operated at a constant normal speed the components themselves on which the products have been delivered being accelerated at intervals with respect to the endless driving band to effect the desired separation of the batches.

What we claim is:

1. In a mechanism for separating a continuous stream of products into a stream of separated counted batches of products, a plurality of travelling supports comprising endless driven members, switch means to divert a predetermined number of successive products in the continuous stream first to first driven members of one support and then to first driven members of another support, secondary endless members driven at higher speed to accelerate first the products on the first driven members of one support and then to accelerate the products on the first driven members of another support and conveying means operating continuously at a speed greater than that of the first driven members to take the accelerated products first from one support and then from another support.

2. In a printing machine delivery mechanism arranged to receive relatively flat products in lapped relation and in a continuous stream, and having means to arrange the products in batches each having a pre-determined number of products, the combination therein of a switch operated periodically by the machine to direct counted products in batches, alternately to each of two travelling supports each having supporting members which are running at a relatively slow speed and are adapted to carry the thus separated batches of products closely lapped relation, and forward them to other supporting members running at a higher speed, and a conveyor arranged to receive the separated batches from the supporting members running at higher speed, first a batch from one and then a batch from the other higher speed supporting member.

3. In a delivery mechanism arranged to receive relatively flat products in lapped relation and in a continuous stream, and having means to arrange the products in batches each having a pre-determined number of products, the combination therein of a first and a second travelling supports providing alternative paths for the products, a switch device operated by the machine after the passage of products for a batch to the first travelling support arranged to divert products for the next batch to the second travelling support, and to divert products in following batches to the first and second travelling supports in alternation, a conveyor arranged to receive in succession the batches of products directed to the first and second travelling supports, and conveying members moving at higher speed for accelerating the movement of each batch of products on either travelling support after the batch is completed while products are being received by the other travelling support, whereby the batches will be spaced apart on the conveyor.

4. In a mechanism for separating a continuous stream of products into a stream of separated batches having the products laid down in an overlapping relationship, a pair of travelling supports, having first endless driven members, a switch device to switch a predetermined number of successive products to one support and then an equal number of products to the other support, secondary endless driven members for each support and running at higher speed to accelerate first a batch of products on one support and then to accelerate a batch of products on the other support, and a conveyor operating continuously at substantially the speed to which the products are accelerated, to take the accelerated batches first from one support and then from the other support.

5. In a delivery mechanism for a printing machine, a device for separating a continuous stream of products into a stream of separated batches of products, including upper and lower conveyors each comprising first endless belts driven at a slow speed and second endless belts driven at a higher speed and arranged to receive products from the first endless belts and to accelerate their movement and thereby space the patches apart, switch means operable to successively divert a batch comprising a predetermined number of products in the continuous stream to the first endless belts of one conveyor and then to divert a batch comprising a like number of products to the first endless belts of the other conveyor, and a high speed take-away conveyor arranged to receive the accelerated and spaced apart batches in turn from the second endless belts of each conveyor and convey the spaced batches in one stream to a distant place.

GEORGE TURRALL.
CHARLES HENRY SKINNER.

REFERENCES CITED

The following references are of record in the file of this patent:

UNITED STATES PATENTS

| Number | Name | Date |
|---|---|---|
| 131,217 | Hoe et al. | Sept. 10, 1872 |
| 1,232,422 | Halvorsen | July 3, 1917 |
| 1,947,396 | Jaite | Feb. 13, 1934 |
| 2,132,227 | Winkler et al. | Oct. 4, 1938 |
| 2,133,727 | Staude | Oct. 18, 1938 |
| 2,367,416 | Matthews | Jan. 16, 1945 |